United States Patent
Bartlett et al.

(10) Patent No.: US 9,661,636 B1
(45) Date of Patent: May 23, 2017

(54) ACTIVELY DROPPING DATA PACKETS DURING VOLTE COMMUNICATION SESSIONS

(71) Applicant: Sprint Communications Company L.P., Overland Park, KS (US)

(72) Inventors: Roger Danforth Bartlett, Merriam, KS (US); Christian Erik Seagren, Pleasanton, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 160 days.

(21) Appl. No.: 14/191,099

(22) Filed: Feb. 26, 2014

(51) Int. Cl.
*H04W 4/00* (2009.01)
*H04W 72/04* (2009.01)

(52) U.S. Cl.
CPC .............................. *H04W 72/0486* (2013.01)

(58) Field of Classification Search
CPC .................................................. H04W 72/0486
USPC ......................................................... 370/329
See application file for complete search history.

(56) References Cited

U.S. PATENT DOCUMENTS

| | | | |
|---|---|---|---|
| 8,018,851 B1* | 9/2011 | Medina et al. ............... | 370/235 |
| 8,339,964 B2 | 12/2012 | Fodor et al. | |
| 2005/0195740 A1* | 9/2005 | Kwon ................. | H04L 43/0882 370/229 |
| 2006/0114936 A1* | 6/2006 | Paffen .......................... | 370/469 |
| 2006/0199594 A1 | 9/2006 | Gundu | |
| 2006/0262720 A1* | 11/2006 | Charny et al. ................ | 370/229 |
| 2007/0097957 A1 | 5/2007 | Cao et al. | |
| 2007/0177630 A1* | 8/2007 | Ranta et al. .................. | 370/473 |
| 2008/0123660 A1* | 5/2008 | Sammour et al. ....... | 370/395.21 |
| 2008/0137537 A1* | 6/2008 | Al-Manthari ..... | H04W 72/1257 370/238 |
| 2008/0198814 A1* | 8/2008 | Wengerter et al. ........... | 370/336 |
| 2010/0027425 A1* | 2/2010 | Cheung ................. | H04L 47/326 370/238 |
| 2010/0080287 A1* | 4/2010 | Ali ............................ | 375/240.03 |
| 2010/0254320 A1* | 10/2010 | Aoyama ....................... | 370/329 |
| 2011/0317642 A1* | 12/2011 | Eravelli et al. ............... | 370/329 |
| 2012/0239998 A1* | 9/2012 | Park et al. .................... | 714/748 |
| 2012/0266038 A1* | 10/2012 | Ou et al. ...................... | 714/748 |
| 2013/0272121 A1* | 10/2013 | Stanwood ........... | H04L 47/2475 370/230 |
| 2013/0304909 A1* | 11/2013 | Pappu ..................... | H04L 43/04 709/224 |

(Continued)

*Primary Examiner* — Melvin Marcelo
*Assistant Examiner* — Peter G Solinsky

(57) ABSTRACT

A wireless access node to facilitate voice over long term evolution (VoLTE) communication sessions comprises a wireless communication transceiver and a processing system. The wireless communication transceiver is configured to exchange VoLTE packets with a wireless communication device during a VoLTE communication session. The processing system is configured to monitor a number of hybrid automatic repeat request (HARQ) retries requested by the wireless communication device during the VoLTE communication session and compare the number of HARQ retries to a threshold value. The processing system is further configured to, if the number of HARQ retries falls below the threshold value, drop a percentage of the VoLTE packets to achieve an overall percentage of packet loss for the VoLTE communication session based on the number of HARQ retries.

20 Claims, 6 Drawing Sheets

(56) References Cited

U.S. PATENT DOCUMENTS

| | | | |
|---|---|---|---|
| 2013/0343192 A1* | 12/2013 | Kotecha | 370/235 |
| 2014/0226475 A1* | 8/2014 | Stewart | H04L 47/20 370/230.1 |
| 2015/0009930 A1* | 1/2015 | Rapaport et al. | 370/329 |
| 2015/0016397 A1* | 1/2015 | Han et al. | 370/329 |
| 2015/0109910 A1* | 4/2015 | Hurd | H04W 28/0242 370/230 |
| 2016/0183188 A1* | 6/2016 | Tsai | H04W 52/0229 370/311 |

* cited by examiner

ACTIVELY DROPPING DATA PACKETS DURING VOLTE COMMUNICATION SESSIONS

TECHNICAL BACKGROUND

A wireless communication device transmits and receives information wirelessly via a wireless access node to communicate over a communication network. Typically, the wireless access node is part of a radio access network (RAN) which provides the wireless communication device with access to further communication networks, systems, and devices. In fourth generation (4G) long term evolution (LTE) communication systems, a wireless communication device is referred to as user equipment (UE), while a wireless access node is called an enhanced node B (eNodeB).

Because the 4G LTE standard supports only packet switching in its all-IP network, the voice over long term evolution (VoLTE) protocol is typically employed to provide voice services over a 4G LTE communication network. The standard implementation of VoLTE utilizes an internet protocol (IP) Multimedia Subsystem (IMS) network with specific profiles for control and media planes to support voice services over LTE.

Given the nature of transmitting information in the form of energy over the air, errors can be introduced while the data is in-route to its destination. To address this concern, error control techniques for data transmissions may be utilized to achieve reliable data transmissions over an unreliable service. One such technique, termed hybrid automatic repeat request (HARQ), provides such error control by encoding data with a forward error correction (FEC) code.

Overview

A method of operating a wireless access node to facilitate voice over long term evolution (VoLTE) communication sessions is disclosed. The method comprises exchanging VoLTE packets with a wireless communication device during a VoLTE communication session. The method further comprises monitoring a number of hybrid automatic repeat request (HARQ) retries requested by the wireless communication device during the VoLTE communication session and comparing the number of HARQ retries to a threshold value. The method further comprises, if the number of HARQ retries falls below the threshold value, dropping a percentage of the VoLTE packets to achieve an overall percentage of packet loss for the VoLTE communication session based on the number of HARQ retries.

A wireless access node to facilitate voice over long term evolution (VoLTE) communication sessions comprises a wireless communication transceiver and a processing system. The wireless communication transceiver is configured to exchange VoLTE packets with a wireless communication device during a VoLTE communication session. The processing system is configured to monitor a number of hybrid automatic repeat request (HARQ) retries requested by the wireless communication device during the VoLTE communication session and compare the number of HARQ retries to a threshold value. The processing system is further configured to, if the number of HARQ retries falls below the threshold value, drop a percentage of the VoLTE packets to achieve an overall percentage of packet loss for the VoLTE communication session based on the number of HARQ retries.

A computer apparatus to facilitate voice over long term evolution (VoLTE) communication sessions comprises software instructions and at least one non-transitory computer-readable storage medium storing the software instructions. The software instructions are configured, when executed by a wireless access node, to direct the wireless access node to exchange VoLTE packets with a wireless communication device during a VoLTE communication session. The software instructions are further configured to direct the wireless access node to monitor a number of hybrid automatic repeat request (HARQ) retries requested by the wireless communication device during the VoLTE communication session and compare the number of HARQ retries to a threshold value. The software instructions are further configured to direct the wireless access node to, if the number of HARQ retries falls below the threshold value, drop a percentage of the VoLTE packets to achieve an overall percentage of packet loss for the VoLTE communication session based on the number of HARQ retries.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
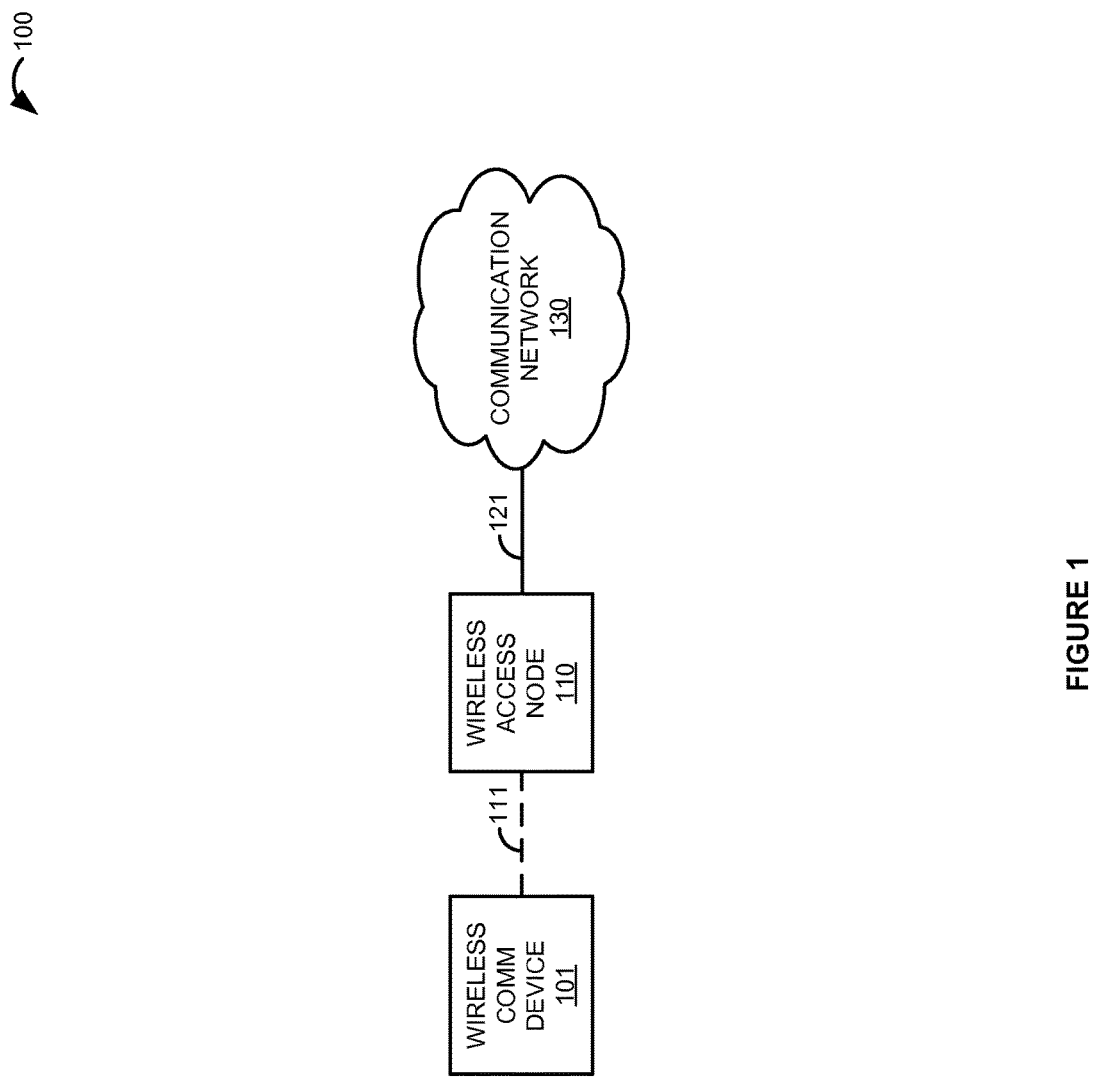
FIG. 1 is a block diagram that illustrates a communication system.

FIG. 1 is a block diagram that illustrates communication system 100. Communication system 100 includes wireless communication device 101, wireless access node 110, and communication network 130. Wireless communication device 101 and wireless access node 110 are in communication over wireless communication link 111. Wireless access node 110 and communication network 130 communicate over communication link 121.

Figure 2:
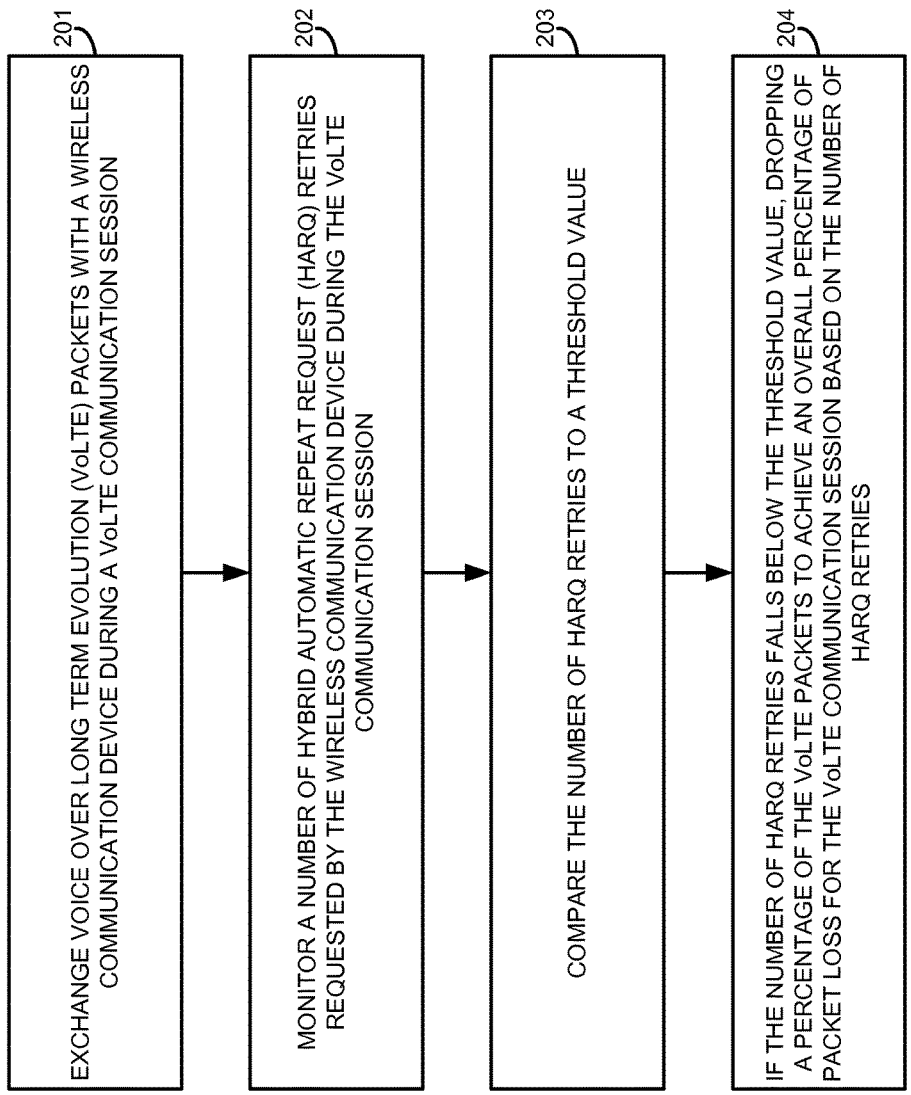
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless access node 110 to facilitate voice over long term evolution (VoLTE) communication sessions.

As shown in the operational flow of FIG. 2, wireless access node 110 exchanges VoLTE packets with wireless communication device 101 during a VoLTE communication session (201). The VoLTE communication session typically comprises a real-time voice call between wireless communication device 101 and another wireless communication device (not shown), which is commonly implemented using an IP Multimedia Subsystem (IMS) and session initiation protocol (SIP) messaging, although other implementations of VoLTE are also possible. The VoLTE packets exchanged between wireless access node 110 and wireless communication device 101 during the VoLTE communication session could comprise any type of data, such as packetized voice data, SIP messaging, signaling messages, frames, or any other data message.

Wireless access node 110 monitors a number of hybrid automatic repeat request (HARQ) retries requested by wireless communication device 101 during the VoLTE communication session (202). Typically, wireless communication device 101 sends HARQ retry requests to wireless access node 110 whenever a packet or sequence is lost or corrupted. For example, if the channel quality is poor on wireless communication link 111 between wireless communication device 101 and wireless access node 110, and not all transmission errors can be corrected with forward error correction (FEC) code, wireless communication device 101 detects the missing or corrupted data block and requests a retransmission of the block by sending a HARQ retry request to wireless access node 110. Wireless access node 110 monitors the HARQ retry requests received from wireless communication device 101 to keep track of the number of HARQ retries requested. In some examples, the number of HARQ retries requested may provide a metric for wireless access node 110 to determine a percentage of lost packets during the VoLTE communication session. In at least one exemplary implementation, wireless access node 110 may ignore the HARQ retries requested by wireless communication device 101 and not resend the affected packets or sequences associated with the HARQ retry requests. For example, wireless access node 110 could determine that the bad or missing data blocks associated with the HARQ retries would not present a noticeable degradation in voice quality during the VoLTE communication session, and thus do not require retransmission. In some examples, wireless access node 110 may determine to not retransmit these packets by calculating a percentage of packet loss based on the number of HARQ retries, and could forgo retransmitting packets that are associated with the HARQ retries as long as the percentage of packet loss is below a threshold value set to ensure acceptable voice transmissions during the VoLTE communication session.

Wireless access node 110 compares the number of HARQ retries to a threshold value (203). The threshold value is typically a predetermined number of HARQ retries, but could also be determined dynamically in some examples. For example, in at least one implementation, wireless access node 110 could dynamically increase the threshold value as the duration of the VoLTE communication session increases. The threshold value could be set to account for a percentage of packet loss based on the number of HARQ retries in some instances. For example, the threshold value could be set to ensure the percentage of packet loss based on the number of HARQ retries does not exceed a predetermined percentage, such as five percent.

If the number of HARQ retries falls below the threshold value, wireless access node 110 drops a percentage of the VoLTE packets to achieve an overall percentage of packet loss for the VoLTE communication session based on the number of HARQ retries (204). The overall percentage of packet loss is a value that is typically predetermined and represents an acceptable level of packet loss while still preserving suitable voice quality during the VoLTE communication session. In some examples, the overall percentage of packet loss for the VoLTE communication session does not exceed a predetermined percentage, such as five percent. Additionally or alternatively, the overall percentage of packet loss for the VoLTE communication session could be based on a quality of service level associated with the VoLTE communication session. In other real-time media sessions, such as streaming video, live sports broadcasts, video chat, internet radio, and other streaming media applications that do not require completely successful transmission rates, the overall percentage of acceptable packet loss could be set to different values depending on the type of streaming media involved.

The number of HARQ retries is compared with the threshold value to determine the percentage of the VoLTE packets that may be actively dropped in order to achieve the overall percentage of packet loss for the VoLTE communication session. In some examples, the threshold is set to ensure that none of the VoLTE packets are actively dropped if the number of HARQ retries causes the percentage of packet loss based on the number of HARQ retries to exceed the overall percentage of packet loss for the VoLTE communication session. In at least one implementation, when dropping the percentage of the VoLTE packets to achieve the overall percentage of packet loss for the VoLTE communication session, wireless access node 110 could determine the percentage of the VoLTE packets to drop by subtracting the percentage of packet loss based on the number of HARQ retries from the overall percentage of packet loss for the VoLTE communication session. For example, if the overall percentage of acceptable packet loss for the VoLTE communication session is set to five percent, and the percentage of packet loss based on the number of HARQ retry requests is determined to be two percent, then the percentage of the VoLTE packets to drop could be calculated as three percent.

Wireless access node 110 commonly utilizes a transmit buffer to cache data that is scheduled for delivery to wireless communication device 101. Typically, the transmit buffer remains full or close to full when wireless communication device 101 and wireless access node 110 are operating in good RF conditions and the majority of data transmitted is received by wireless communication device 101 successfully. However, the transmit buffer of wireless access node 110 may become empty if data is getting lost or corrupted en route to wireless communication device 101 and frequent retransmissions of the data are necessary. Therefore, in some examples, when dropping the percentage of the VoLTE packets to achieve the overall percentage of packet loss for the VoLTE communication session, wireless access node 110 could drop the percentage of the VoLTE packets to achieve the overall percentage of packet loss as long as a transmit buffer of wireless access node 110 is not empty. In other words, if a transmit buffer of wireless access node 110 becomes empty, wireless access node 110 may cease actively dropping the VoLTE data packets until the transmit buffer refills to a predetermined acceptable level.

Advantageously, wireless access node 110 actively drops VoLTE packets in order to achieve an overall percentage of acceptable packet loss for the VoLTE communication session. Since real-time streaming applications such as VoLTE do not require perfect reception of all data packets for the audio data to be communicated to the listener, some VoLTE data packets may be actively dropped without introducing any noticeable degradation in voice quality. To determine the amount of VoLTE packets to drop, wireless access node 110 takes into account the effect of HARQ retry requests with respect to the successful transmission rate of data packets. In this manner, wireless access node 110 is able to determine and actively drop a certain percentage of VoLTE data packets that will not be detected by a user listening to the incoming voice packets on wireless communication device 101, thereby saving valuable forward link timeslots and other network resources.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
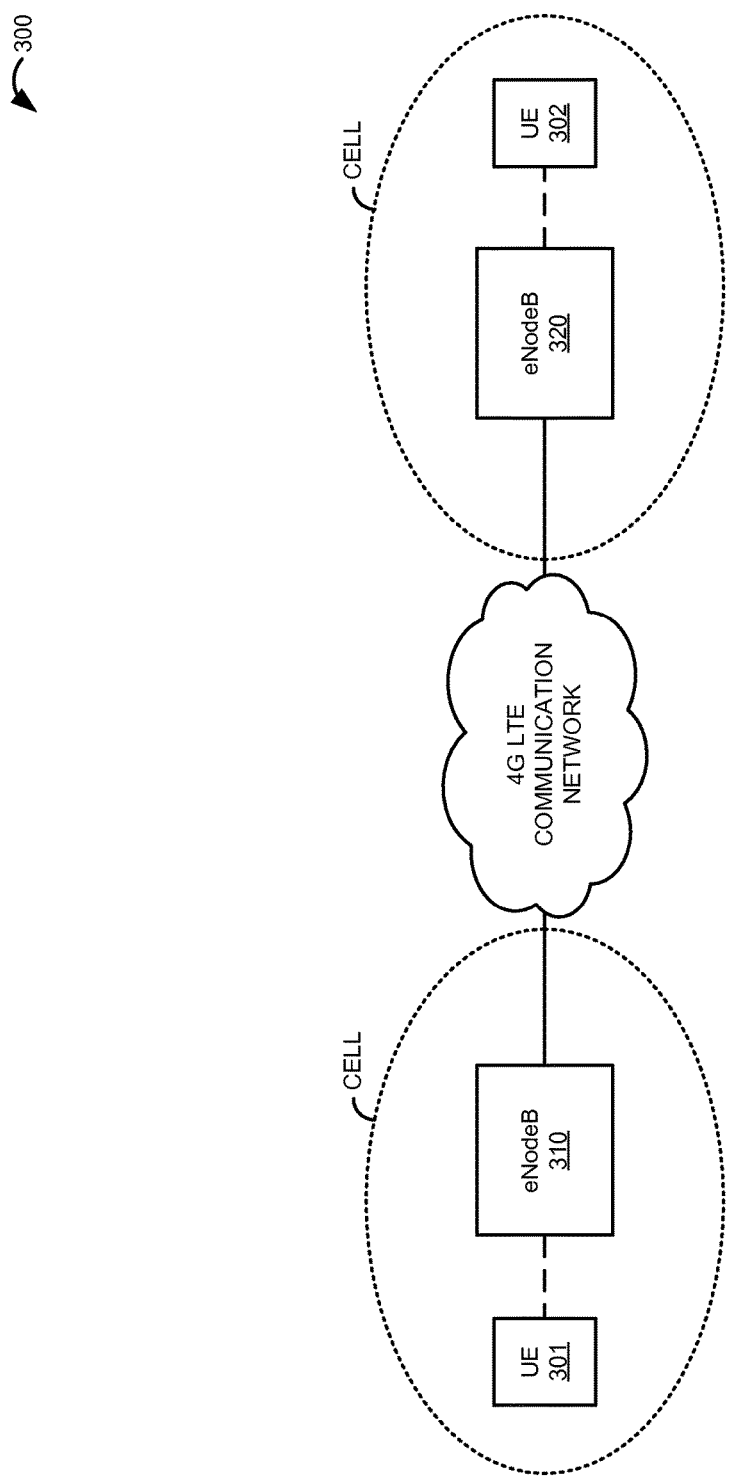
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes two enhanced Node B (eNodeB) base stations 310 and 320 that are in communication with the 4G LTE communication network. LTE communication system 300 also includes user equipment (UE) devices 301 and 302 which are shown as being served by respective eNodeB base stations 310 and 320. The eNodeB base stations 310 and 320 provide examples of wireless access node 110, although node 110 may use alternative configurations. The 4G LTE communication network could include a mobility management entity (MME), serving gateway (SGW), packet data network gateway (PGW), and other network elements typically found in an LTE network. Each eNodeB 310 and 320 serves a cell having a wireless coverage area with approximate boundaries as indicated by the dotted line encircling each eNodeB, which is typically defined by the signal propagation characteristics and coverage capabilities of each eNodeB 310 and 320.

In operation, UE devices 301 and 302 may engage in a VoLTE communication session to establish a voice call over the 4G LTE communication network. In areas where LTE RF coverage provided by respective eNodeBs 310 and 320 is very good, UE devices 301 and 302 will rarely miss receiving VoLTE data packets during the voice call. However, for VoLTE and other real-time applications that do not require 100% successful packet transmission rates, the UEs 301 and 302, when operating in very good RF coverage areas, may receive packets that have no effect on the quality of a real-time communication session as perceived by the users of UEs 301 and 302. For example, a wireless voice call may exhibit an acceptable packet loss of up to two percent with no degradation of voice quality detectable to the human ear. Therefore, VoLTE calls experiencing little to no packet loss are wasting up to two percent of the data being transmitted since this bandwidth could be used for other purposes. A detailed description of how eNodeBs 310 and 320 might intelligently drop unnecessary VoLTE packets during a voice call between UE devices 301 and 302 will now be discussed with respect to FIG. 4.

Figure 4:
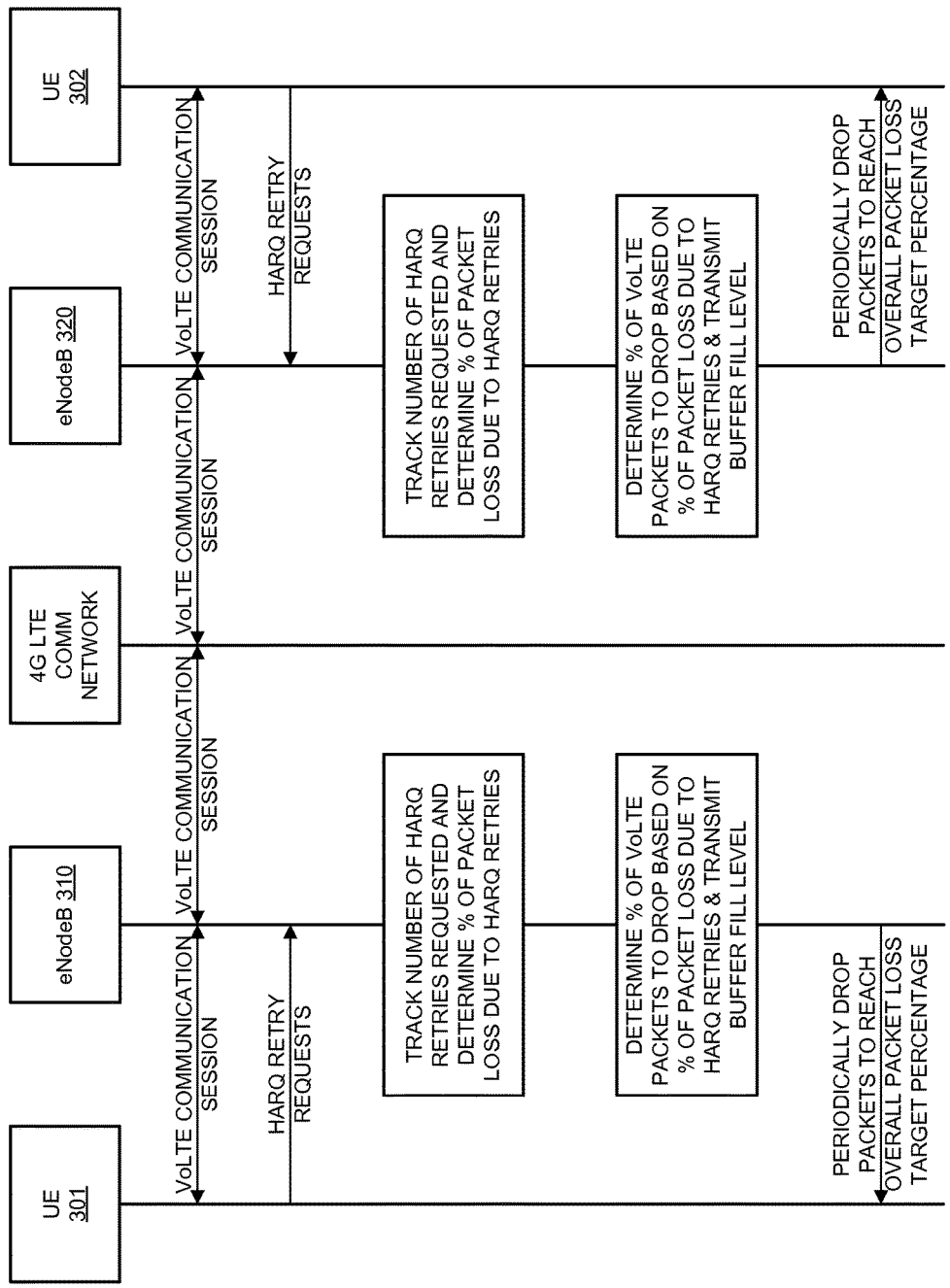
FIG. 4 is a sequence diagram that illustrates an operation of a communication system in an exemplary embodiment.

FIG. 4 is a sequence diagram that illustrates an operation of LTE communication system 300 in an exemplary embodiment. In this example, UE devices 301 and 302 are engaged in a VoLTE communication session via their respective eNodeBs 310 and 320 via the 4G LTE communication network. The LTE network in this example utilizes HARQ for error correction, which attempts to ensure reliable data services through retransmissions of missing or corrupted data packets. During the VoLTE call, UE devices 301 and 302 request a number of HARQ retries for VoLTE packets that are either not correctly received or not received whatsoever.

Instead of retransmitting the VoLTE packets associated with the HARQ retry requests, eNodeBs 310 and 320 ignore these requests and consider the errors as part of the acceptable packet loss for the VoLTE communication session that will go undetected by the users of UE devices 301 and 302. The eNodeBs 310 and 320 track the number of HARQ retries requested by their respective UEs 301 and 302 and determine the percentage of packet loss due to the number HARQ retries. This percentage of packet loss that is attributable to the HARQ retries is calculated dynamically by eNodeBs 310 and 320 and will typically change throughout the duration of the VoLTE communication session. Of course, in situations where very poor RF quality causes the percentage of packet loss due to ignoring the HARQ retry requests to rise to unacceptable levels, eNodeBs 310 and 320 will start honoring the HARQ retry requests and retransmit enough of the missing packets to ensure acceptable communication quality. For example, eNodeBs 310 and 320 could compare the percentage of packet loss that is attributable to the HARQ retries to a threshold and would commence retransmitting the requested packets if the percentage of packet loss due to the number of HARQ retries exceeds the threshold.

After determining the percentage of packet loss attributable to the number of HARQ retries, eNodeBs 310 and 320 determine a percentage of VoLTE packets to actively drop based on the percentage of packet loss due to the number of HARQ retries and a transmit buffer fill level. To calculate the percentage of VoLTE packets to drop, eNodeBs 310 and 320 could subtract the percentage of packet loss due to the number of HARQ retries requested from an overall packet loss target percentage. In this example, there is an overall packet loss target percentage set to five percent for each UE 301 and 302 during VoLTE voice calls, which is based on a QoS level associated with these UEs. The overall packet loss target percentage could be set higher or lower depending on the application, QoS level, RF coverage, and other factors. For example, a streaming video application could have an overall packet loss target percentage of only one percent because higher levels of dropped packets could result in jittery or delayed video playback. The eNodeBs 310 and 320 also factor in a fill level of their respective transmit buffers, where the percentage of VoLTE packets to drop decreases as the fill level of the transmit buffer decreases. A graphical example of how the percentage of VoLTE packets to drop is affected by the eNodeB transmit buffer fill level and the percentage of packet loss from HARQ retries is provided in the trend diagrams of FIG. 5.

After the percentage of VoLTE packets to drop is determined by each eNodeB 310 and 320, the eNodeBs 310 and 320 periodically drop VoLTE packets to reach the overall packet loss target percentage. As discussed above, the overall packet loss target percentage is five percent for each UE 301 and 302 in this example. Assuming the percentage of packet loss attributable to ignoring HARQ retry requests was determined to be three percent for each UE 301 and 302, and that the transmit buffer fill levels of each eNodeB 310 and 320 remain completely full, then the percentage of VoLTE packets to drop could be calculated as two percent for each UE 301 and 302. Accordingly, each eNodeB 310 and 320 would discard every fiftieth VoLTE packet to achieve the two percent drop rate for VoLTE packets in this example. By periodically dropping VoLTE packets in this manner, the eNodeBs 310 and 320 preserve bandwidth and other system resources without sacrificing voice quality during the VoLTE communication session between UEs 301 and 302.

Figure 5:
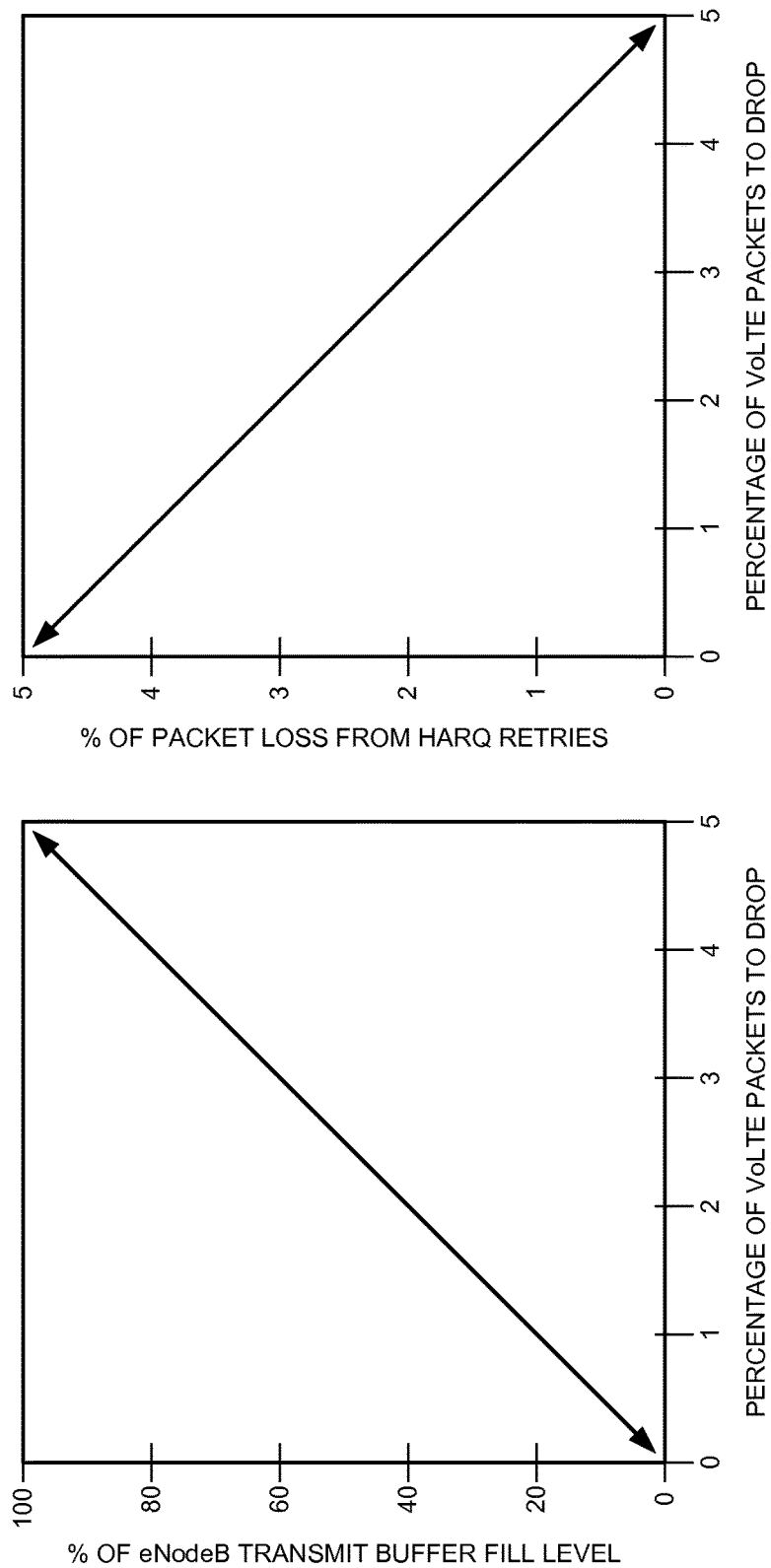
FIG. 5 illustrates two trend diagrams in an exemplary embodiment.

FIG. 5 illustrates two trend diagrams in an exemplary embodiment. Both trend diagrams show a percentage of VoLTE packets to drop on a scale of zero to five percent in this example. The scale of zero to five percent used in this example is indicative of an overall packet loss target percentage of five percent as discussed above with respect to the sequence diagram of FIG. 4, although different target percentages could be used in other examples.

The trend diagram on the left hand side of FIG. 5 shows the percentage of eNodeB transmit buffer fill level on a scale of zero to one hundred percent on the vertical Y axis, and the percentage of VoLTE packets to drop along the horizontal X axis. Similarly, the trend diagram on the right hand side of FIG. 5 shows the percentage of packet loss due to the number of HARQ retry requests on a scale of zero to five percent along the Y axis against the percentage of VoLTE packets to drop along the X axis.

As can been seen by the trend diagram on the left hand side of FIG. 5, there is a direct relationship between the eNodeB transmit buffer fill level and the percentage of VoLTE packets to actively drop. When the eNodeB transmit buffer fill level is empty, zero percent of the VoLTE packets should be actively dropped. However, when the eNodeB transmit buffer is 100% full, up to five percent of the VoLTE packets can be actively dropped at the eNodeB.

Conversely, there is an indirect relationship between the percentage of packet loss from HARQ retries and the percentage of VoLTE packets to actively drop, as shown in the trend diagram appearing on the right hand side of FIG. 5. Accordingly, when the percentage of packet loss attributable to HARQ retry requests is determined to be five percent, no VoLTE packets should be actively dropped, since the overall packet loss target percentage of five percent has already been achieved by the eNodeB simply ignoring HARQ retry requests. However, when the percentage of packet loss due to HARQ retries is zero percent, then up to five percent of VoLTE packets may be actively dropped at the eNodeB.

The two trend diagrams shown in FIG. 5 could be combined to determine the percentage of VoLTE packets to actively drop with respect to both the eNodeB transmit buffer fill level and the percentage of packet loss due to HARQ retry requests. For example, if the percentage of packet loss from HARQ retries is one percent, then four percent of VoLTE packets may be actively dropped at the eNodeB, but this percentage may be reduced if the transmit buffer fill level is less than 100% full. Also, although the preceding examples have discussed actively dropping VoLTE packets at the eNodeB before they are sent to the UE, the techniques disclosed herein could also be applied at the UE. For example, the UE could track the number of HARQ retries and monitor its own transmit buffer fill level in order to determine a percentage of outgoing VoLTE packets to drop before transmitting them to its serving eNodeB. In some examples, this could be implemented by session initiation protocol (SIP) messaging between the UE and the IMS network, where the IMS network could signal the UE to start and/or stop actively dropping VoLTE packets according to the factors described herein.

Figure 6:
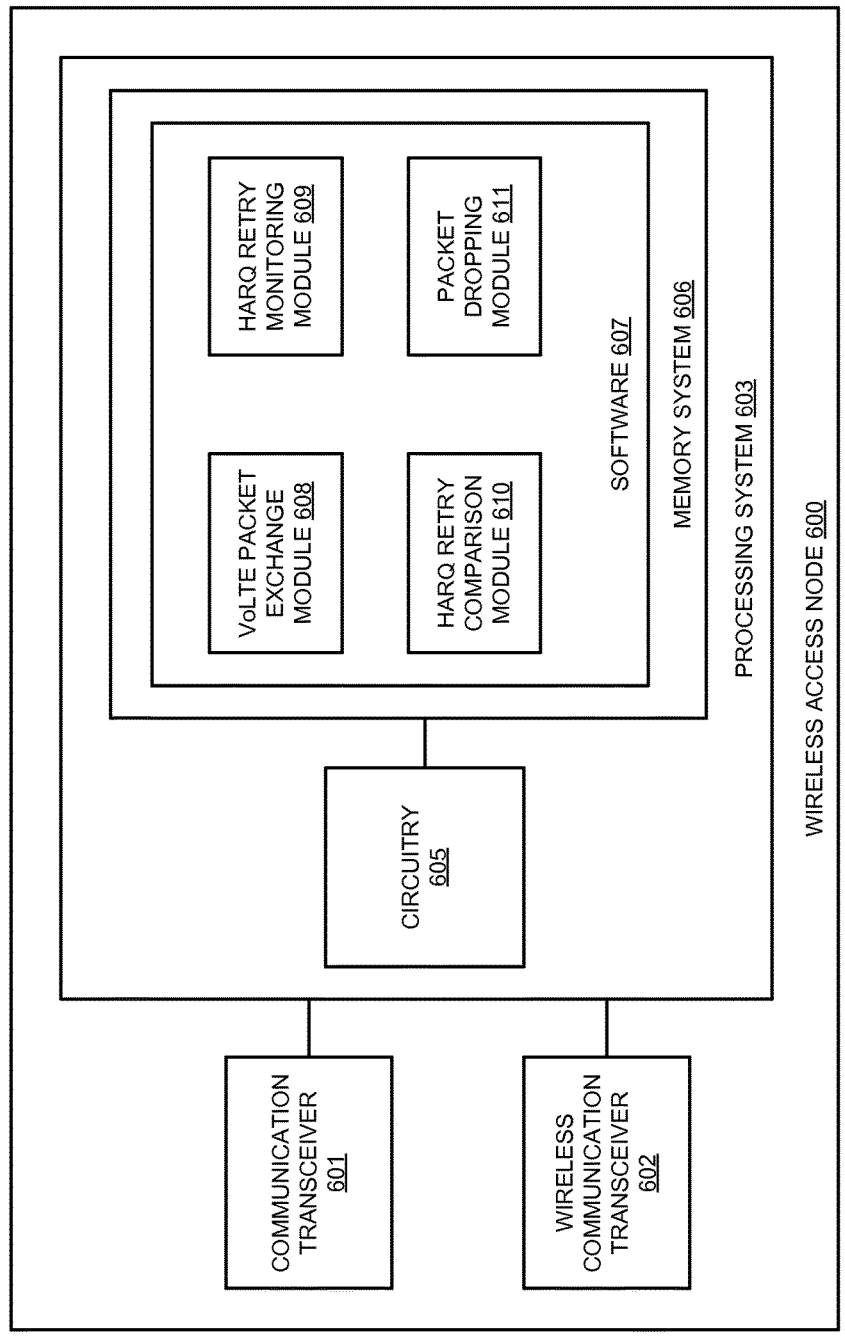
FIG. 6 is a block diagram that illustrates a wireless access node.

FIG. 6 is a block diagram that illustrates wireless access node 600. Wireless access node 600 provides an example of wireless access node 110, although node 110 may have alternative configurations. Wireless access node 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608-611.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 602 is configured to exchange VoLTE packets with a wireless communication device during a VoLTE communication session.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. In some examples, a computer apparatus could comprise memory system 606 and operating software 607. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-611, although software 607 could have alternative configurations in other examples.

When executed by circuitry 605, operating software 607 directs processing system 603 to operate as described herein for wireless access node 110. In particular, operating software 607 may direct processing system 603 to direct wireless communication transceiver 602 to exchange VoLTE packets with a wireless communication device during a VoLTE communication session. Operating software 607 directs processing system 603 to monitor a number of hybrid automatic repeat request (HARQ) retries requested by the wireless communication device during the VoLTE communication session. Operating software 607 further directs processing system 603 to compare the number of HARQ retries to a threshold value. Finally, if the number of HARQ retries falls below the threshold value, operating software 607 directs processing system 603 to drop a percentage of the VoLTE packets to achieve an overall percentage of packet loss for the VoLTE communication session based on the number of HARQ retries.

In this example, operating software 607 comprises a VoLTE packet exchange software module 608 that exchanges VoLTE packets with a wireless communication device during a VoLTE communication session. In addition, operating software 607 comprises a HARQ retry monitoring software module 609 that monitors a number of hybrid automatic repeat request (HARQ) retries requested by the wireless communication device during the VoLTE communication session. Operating software 607 also comprises a HARQ retry comparison software module 610 that compares the number of HARQ retries to a threshold value. Finally, operating software 607 comprises a packet dropping software module 611 that, if the number of HARQ retries falls below the threshold value, drops a percentage of the VoLTE packets to achieve an overall percentage of packet loss for the VoLTE communication session based on the number of HARQ retries.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node to facilitate voice over long term evolution (VoLTE) communication sessions, the method comprising:
   exchanging VoLTE packets with a wireless communication device during a VoLTE communication session;
   monitoring a number of hybrid automatic repeat request (HARQ) retries requested by the wireless communication device during the VoLTE communication session;
   comparing the number of HARQ retries to a threshold value; and
   if the number of HARQ retries falls below the threshold value, dropping a percentage of the VoLTE packets to achieve an overall percentage of packet loss for the VoLTE communication session based on the number of HARQ retries.

2. The method of claim 1 further comprising determining a percentage of packet loss based on the number of HARQ retries.

3. The method of claim 2 wherein dropping the percentage of the VoLTE packets to achieve the overall percentage of packet loss for the VoLTE communication session based on the number of HARQ retries comprises determining the percentage of the VoLTE packets to drop by subtracting the percentage of packet loss based on the number of HARQ retries from the overall percentage of packet loss for the VoLTE communication session.

4. The method of claim 2 wherein the threshold is set to ensure that none of the VoLTE packets are actively dropped if the number of HARQ retries causes the percentage of packet loss based on the number of HARQ retries to exceed the overall percentage of packet loss for the VoLTE communication session.

5. The method of claim 1 wherein the overall percentage of packet loss for the VoLTE communication session does not exceed five percent.

6. The method of claim 1 wherein the overall percentage of packet loss for the VoLTE communication session is based on a quality of service level associated with the VoLTE communication session.

7. The method of claim 1 wherein dropping the percentage of the VoLTE packets to achieve the overall percentage of packet loss for the VoLTE communication session comprises dropping the percentage of the VoLTE packets to achieve the overall percentage of packet loss as long as a transmit buffer of the wireless access node is not empty.

8. A wireless access node to facilitate voice over long term evolution (VoLTE) communication sessions, the wireless access node comprising:
    a wireless communication transceiver configured to exchange VoLTE packets with a wireless communication device during a VoLTE communication session; and
    a processing system configured to monitor a number of hybrid automatic repeat request (HARQ) retries requested by the wireless communication device during the VoLTE communication session, compare the number of HARQ retries to a threshold value, and if the number of HARQ retries falls below the threshold value, drop a percentage of the VoLTE packets to achieve an overall percentage of packet loss for the VoLTE communication session based on the number of HARQ retries.

9. The wireless access node of claim 8 wherein the processing system is further configured to determine a percentage of packet loss based on the number of HARQ retries.

10. The wireless access node of claim 9 wherein the processing system configured to drop the percentage of the VoLTE packets to achieve the overall percentage of packet loss for the VoLTE communication session based on the number of HARQ retries comprises the processing system configured to determine the percentage of the VoLTE packets to drop by subtracting the percentage of packet loss based on the number of HARQ retries from the overall percentage of packet loss for the VoLTE communication session.

11. The wireless access node of claim 9 wherein the threshold is set to ensure that none of the VoLTE packets are actively dropped if the number of HARQ retries causes the percentage of packet loss based on the number of HARQ retries to exceed the overall percentage of packet loss for the VoLTE communication session.

12. The wireless access node of claim 8 wherein the overall percentage of packet loss for the VoLTE communication session does not exceed five percent.

13. The wireless access node of claim 8 wherein the overall percentage of packet loss for the VoLTE communication session is based on a quality of service level associated with the VoLTE communication session.

14. The wireless access node of claim 8 wherein the processing system configured to drop the percentage of the VoLTE packets to achieve the overall percentage of packet loss for the VoLTE communication session comprises the processing system configured to drop the percentage of the VoLTE packets to achieve the overall percentage of packet loss as long as a transmit buffer of the wireless access node is not empty.

15. A computer apparatus to facilitate voice over long term evolution (VoLTE) communication sessions, the apparatus comprising:
    software instructions configured, when executed by a wireless access node, to direct the wireless access node to exchange VoLTE packets with a wireless communication device during a VoLTE communication session, monitor a number of hybrid automatic repeat request (HARQ) retries requested by the wireless communication device during the VoLTE communication session, compare the number of HARQ retries to a threshold value, and if the number of HARQ retries falls below the threshold value, drop a percentage of the VoLTE packets to achieve an overall percentage of packet loss for the VoLTE communication session based on the number of HARQ retries; and
    at least one non-transitory computer-readable storage medium storing the software instructions.

16. The computer apparatus of claim 15 wherein the software instructions are further configured to direct the wireless access node to determine a percentage of packet loss based on the number of HARQ retries.

17. The computer apparatus of claim 16 wherein the software instructions configured to direct the wireless access node to drop the percentage of the VoLTE packets to achieve the overall percentage of packet loss for the VoLTE communication session based on the number of HARQ retries comprises the software instructions configured to direct the wireless access node to determine the percentage of the VoLTE packets to drop by subtracting the percentage of packet loss based on the number of HARQ retries from the overall percentage of packet loss for the VoLTE communication session.

18. The computer apparatus of claim 16 wherein the threshold is set to ensure that none of the VoLTE packets are actively dropped if the number of HARQ retries causes the percentage of packet loss based on the number of HARQ retries to exceed the overall percentage of packet loss for the VoLTE communication session.

19. The computer apparatus of claim 15 wherein the overall percentage of packet loss for the VoLTE communication session does not exceed five percent.

20. The computer apparatus of claim 15 wherein the overall percentage of packet loss for the VoLTE communication session is based on a quality of service level associated with the VoLTE communication session.

* * * * *